(12) United States Patent
Van Lancker et al.

(10) Patent No.: US 10,338,791 B2
(45) Date of Patent: *Jul. 2, 2019

(54) INTERFACE FOR NAVIGATING IMAGERY

(71) Applicant: Google Inc., Mountain View, CA (US)

(72) Inventors: Willem Van Lancker, New York, NY (US); Christopher Robert Harrelson, Berkeley, CA (US); Matthew Robert Simpson, San Francisco, CA (US); Amanda Marie Leicht Moore, San Francisco, CA (US)

(73) Assignee: Google LLC, Mountain View, CA (US)

( * ) Notice: Subject to any disclaimer, the term of this patent is extended or adjusted under 35 U.S.C. 154(b) by 362 days.

This patent is subject to a terminal disclaimer.

(21) Appl. No.: 15/392,220

(22) Filed: Dec. 28, 2016

(65) Prior Publication Data

US 2017/0109024 A1 Apr. 20, 2017

Related U.S. Application Data

(63) Continuation of application No. 13/287,173, filed on Nov. 2, 2011, now Pat. No. 9,569,066.

(Continued)

(51) Int. Cl.
*G06F 3/048* (2013.01)
*G06F 3/0484* (2013.01)
(Continued)

(52) U.S. Cl.
CPC .......... *G06F 3/04845* (2013.01); *G06F 3/048* (2013.01); *G06F 3/04815* (2013.01);
(Continued)

(58) Field of Classification Search
None
See application file for complete search history.

(56) References Cited

U.S. PATENT DOCUMENTS 6,346,938 B1 *  2/2002  Chan ................... G06F 3/04815
                                                    345/419
7,707,516 B2 *  4/2010  O'Mullan ............. G06F 3/0481
                                                    715/834

(Continued)

FOREIGN PATENT DOCUMENTS

EP       1293756       11/2003

OTHER PUBLICATIONS

Autocad 2010, http://docs.autodesk.com/ACD/2010/ENU/AutoCAD%202010%20USer%20Documentation/index.html?url=WS73099cc142f48755-42a8108711a530ffld3-53d8.htm.topicNumber=d0e26819, 2009, 2 pages.

(Continued)

*Primary Examiner* — Kevin L Young
*Assistant Examiner* — Haimei Jiang
(74) *Attorney, Agent, or Firm* — Dority & Manning, P.A.

(57) ABSTRACT

A user interface for rotating imagery among a plurality of canonical views of a geographic area of interest is disclosed. The interface includes at least one rotation control icon for rotating the imagery among a plurality of canonical views of the geographic area, and a direction indicating portion that indicates a compass direction associated with the canonical view presented on the display device. In particular implementations, the interface can be configured to come into view over the imagery whenever a user navigates to a particular view of the imagery where a plurality of canonical views is available. The motion of the navigation control interface appearing into the imagery is intended to draw attention to the control interface to inform the user that additional canonical views are available.

20 Claims, 10 Drawing Sheets

Related U.S. Application Data

(60) Provisional application No. 61/542,478, filed on Oct. 3, 2011.

(51) Int. Cl.

| | | |
|---|---|---|
| *G06F 3/0481* | (2013.01) | |
| *G06T 15/20* | (2011.01) | |
| *G06T 17/05* | (2011.01) | |
| *G06T 19/00* | (2011.01) | |
| *G09B 29/00* | (2006.01) | |
| *G09B 29/10* | (2006.01) | |
| *G09G 5/377* | (2006.01) | |

(52) U.S. Cl.
CPC .......... *G06F 3/04817* (2013.01); *G06T 15/20* (2013.01); *G06T 17/05* (2013.01); *G06T 19/00* (2013.01); *G09B 29/005* (2013.01); *G09B 29/10* (2013.01); *G09B 29/106* (2013.01); *G09G 5/377* (2013.01); *G09G 2340/045* (2013.01); *G09G 2340/12* (2013.01); *G09G 2354/00* (2013.01)

(56) References Cited

U.S. PATENT DOCUMENTS

| | | | |
|---|---|---|---|
| 2003/0105576 A1* | 6/2003 | Kamiya | G01C 21/3664 701/102 |
| 2005/0081164 A1* | 4/2005 | Hama | G06F 3/0482 715/830 |
| 2007/0070090 A1* | 3/2007 | Debettencourt | G01C 21/3664 345/672 |
| 2007/0273712 A1 | 11/2007 | O'Mullan et al. | |
| 2008/0172632 A1* | 7/2008 | Stambaugh | G06F 3/04817 715/781 |
| 2009/0179895 A1* | 7/2009 | Zhu | G06T 19/00 345/424 |
| 2009/0245691 A1* | 10/2009 | Naimark | G06T 19/006 382/285 |
| 2009/0289914 A1* | 11/2009 | Cho | G06F 3/044 345/173 |
| 2009/0325607 A1* | 12/2009 | Conway | G06F 1/1624 455/456.3 |
| 2010/0162150 A1* | 6/2010 | O'Mullan | G06F 3/0481 715/764 |
| 2010/0166221 A1* | 7/2010 | Utsugi | H04B 1/082 381/103 |
| 2010/0169827 A1* | 7/2010 | Banks | G06F 3/04847 715/800 |
| 2010/0215250 A1* | 8/2010 | Zhu | G06T 17/05 382/154 |
| 2010/0250619 A1* | 9/2010 | Hulubei | G06F 16/29 707/803 |
| 2011/0066963 A1* | 3/2011 | Schrag | G06F 3/04815 715/769 |
| 2011/0106654 A1* | 5/2011 | Lee | G06Q 10/06 705/26.8 |
| 2011/0119637 A1* | 5/2011 | Tuli | G06F 16/68 715/863 |
| 2011/0209201 A1* | 8/2011 | Chollat | G06F 21/6218 726/4 |
| 2012/0174022 A1* | 7/2012 | Sandhu | A61B 34/25 715/781 |
| 2012/0244876 A1* | 9/2012 | Park | G06F 3/0489 455/456.1 |

OTHER PUBLICATIONS

Coombs et al., "Google Power Toots Bible", http://proquest.safaribooksonline.com/book/web-applications-and-services/9780470097120, pp. 157 and 159, accessed on Jun. 25, 2015.
International Search Report from PCT/US2012/058506—2 pages.
Google Earth User Guide, 2007, hereinafter Goggle Earth, 131 pages.
RCATS, "Google Earth: Interfacing with RCATS Telemetry Systems", Mar. 31 2006, pp. 1-8.
Screenshot of Bing Map 1—Nov. 2, 2011—1 page.
Screenshot of Bing Map 2—Nov. 2, 2011—1 page.

* cited by examiner

INTERFACE FOR NAVIGATING IMAGERY

PRIORITY CLAIM

The present application is a continuation of U.S. application Ser. No. 13/287,173 having a filing date of Nov. 2, 2011. Applicants claim priority to and benefit of all such applications and incorporate all such applications herein by reference.

FIELD

The present disclosure relates to user interfaces for computer graphics systems and, more particularly, to user interfaces for navigating different views of imagery, such as three-dimensional (3D) map imagery.

BACKGROUND

Improvements in computer processing power and content delivery have led to the development of interactive 3D imagery, such as 3D map imagery. Services such as Google Maps are capable of displaying 3D images of a geographic location from a near top-down perspective, an angled or oblique perspective, or from a street level or ground-based perspective at a particular geographic location. These services typically provide a user interface that allows a user to navigate through the map imagery. For instance, a typical user interface may allow a user to pan, tilt, rotate, and mom the imagery at a geographic point of interest.

Many times, there are multiple canonical views of imagery available for display at a particular geographic point of interest. For instance, canonical views of a geographic point from the north, south, east, and west orientations may be available for display to a user. In the ground-based or street view context, canonical views along a predominant road or feature of interest may be available.

SUMMARY

Aspects and advantages of the invention will be set forth in pan in the following description, or may be obvious from the description, or may be learned through practice of the invention.

A need exists for an interface that informs the user when additional views of a geographic point of interest are available as well as for allowing a user to navigate the different views. A user interface that can provide a visual indication of which direction the view is currently oriented and that provides a graceful transition and visual continuity between different orientations would be particularly useful.

One exemplary implementation of the present disclosure is directed to a computer-implemented method of navigating imagery. The method includes presenting as user interlace on a display device. The user interface includes a display area far presenting imagery comprising a canonical view of a geographic area. The method further includes presenting a navigation control interface overlying the imagery. The navigation control interface is configured to rotate the imagery among a plurality of canonical views of the geographic area upon user interaction with the navigation control interface. The navigation control interface includes a direction indicating portion that indicates a compass direction associated with the canonical view presented on the display device. The method includes receiving a user input directed to the navigation control interface; and rotating the direction indicating portion and the imagery synchronously in response to the user input directed to the navigation control interface.

Other exemplary implementations of the present disclosure are directed to systems, apparatus, computer-readable mediums, devices, and user interfaces for navigating imagery.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
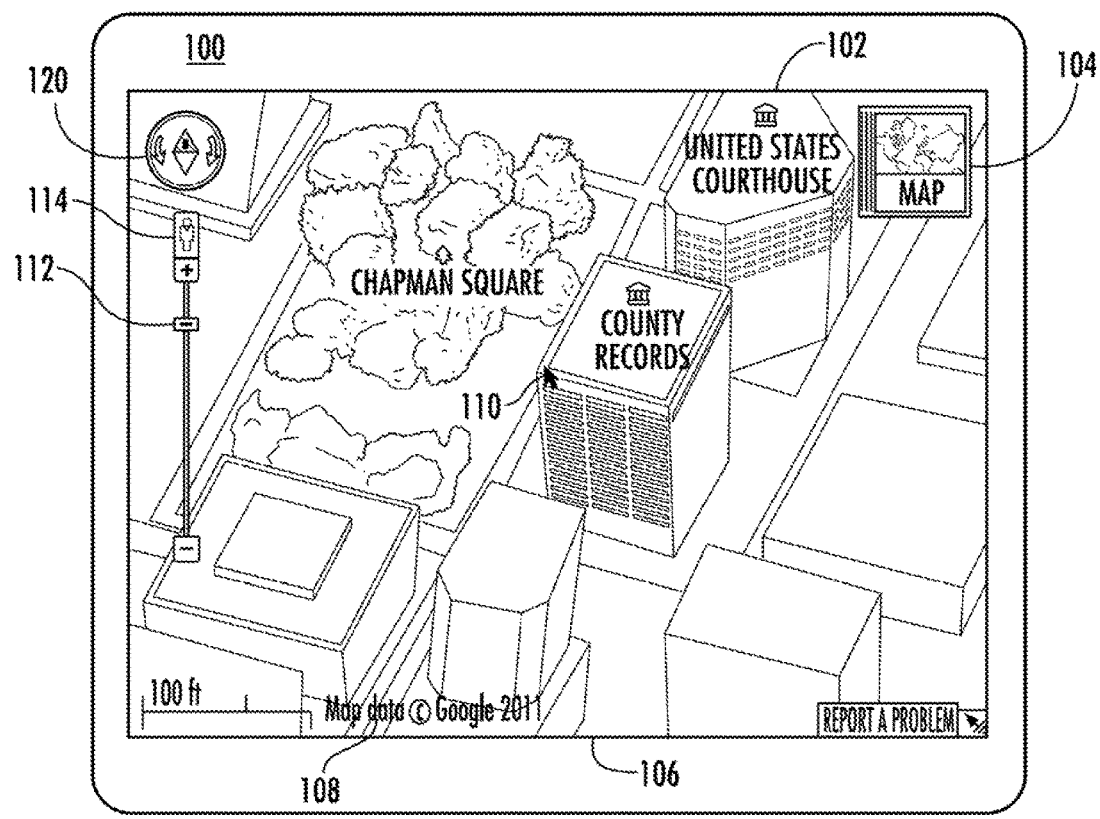
FIG. 1 depicts a user interface including an exemplary navigation control interface overlying the imagery according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a simplified user interface for rotating imagery among a plurality of canonical views of a geographic area of interest. As used herein, a canonical view is a view of imagery from a standardized orientation or viewpoint. For instance, canonical views of a geographic area of interest can include a north view, a south view, an east view, or a west view. A canonical view of a geographic area of interest could also include a northeast view, a northwest view, a southeast view, and a southwest view. In other implementations, such as in the context of viewing ground-based or street view imagery, a canonical view can be generally along a predominate road, vector, or other feature depicted in the imagery at generally perpendicular to a predominate road, vector, or other feature depicted in the imagery.

The simplified user interface includes a navigation control interface that is generally depicted as a compass. The navigation control interface can include clockwise and counterclockwise rotation icons in addition to a compass needle that laces north or other suitable direction. A user can interact with the compass interface to easily rotate the imagery among the plurality of canonical views of the geographic area. For instance, a user can interact with the compass interface to rotate oblique-view imagery among the north view, east view, south view, and west view. In the street view context, a user can interact with the compass interface to rotate the street view imagery among views generally along a road or other feature depicted in the street view imagery and views generally perpendicular to a road or other feature depicted in the street view imagery.

Upon user interaction with the compass, the imagery and the compass needle are synchronously rotated among the canonical views associated with the geographic area. In this manner, the compass needle provides an indication of the direction in which the user is oriented when navigating through the imagery providing a useful context when browsing the imagery.

FIG. 1 illustrates a user interface 100 that includes a navigation control interface 120 for navigating imagery 102. In some implementations, the user interlace 100 is provided by a mapping tool, such as Google Maps or Google Earth developed by Google Inc. (Mountain View, Calif.), or other suitable mapping service. The user interface 100 can be generated for presentation on a display device, such as any of the display devices described in reference to FIGS. 14 and 15. A user system can be any device capable of displaying and navigating imagery, including but not limited to: personal computers, mobile phones, smart phones, personal digital assistants (PDAs), tablets, television devices, media players and other devices capable of displaying and navigating imagery.

Figure 6:
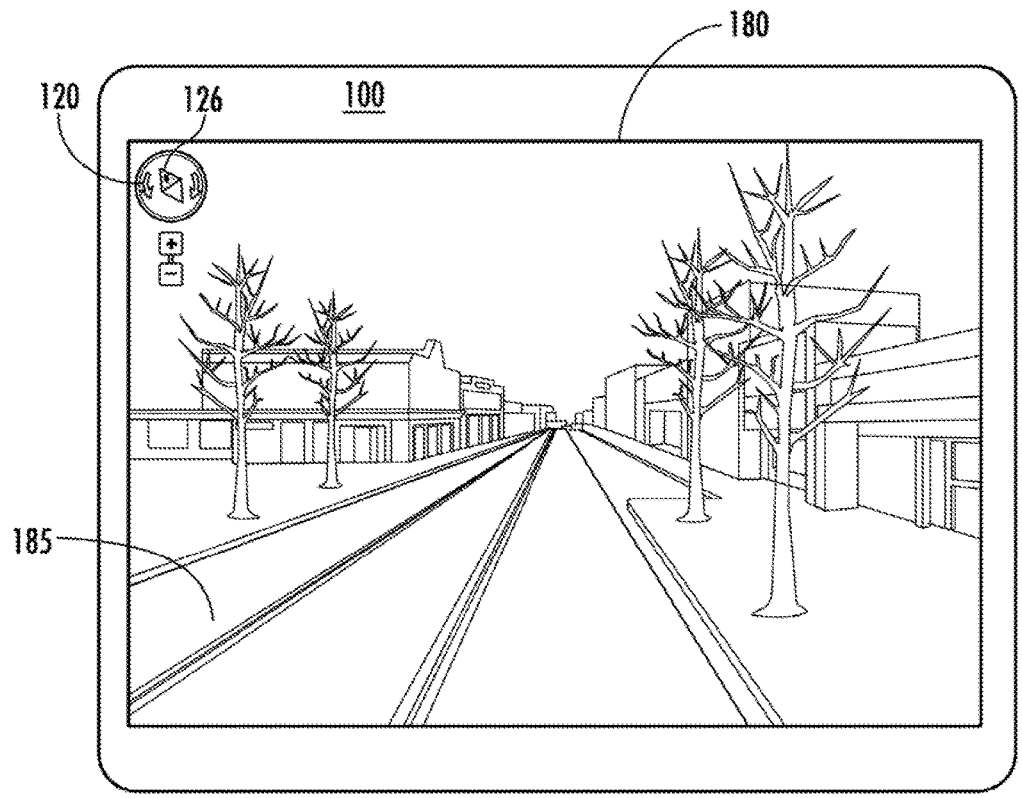
FIGS. 6, 7, and 8 depict an exemplary navigation control interface exhibiting rotation control fir for street view imagery according to an exemplary embodiment of the present disclosure.
Figure 7:
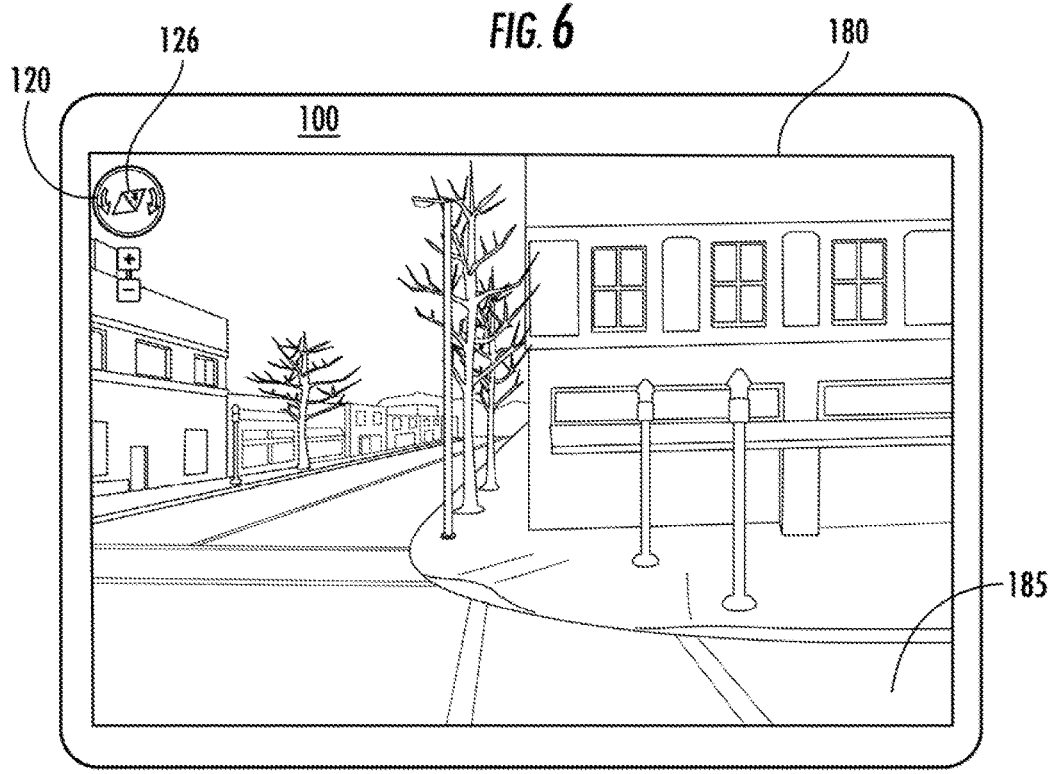
Figure 8:
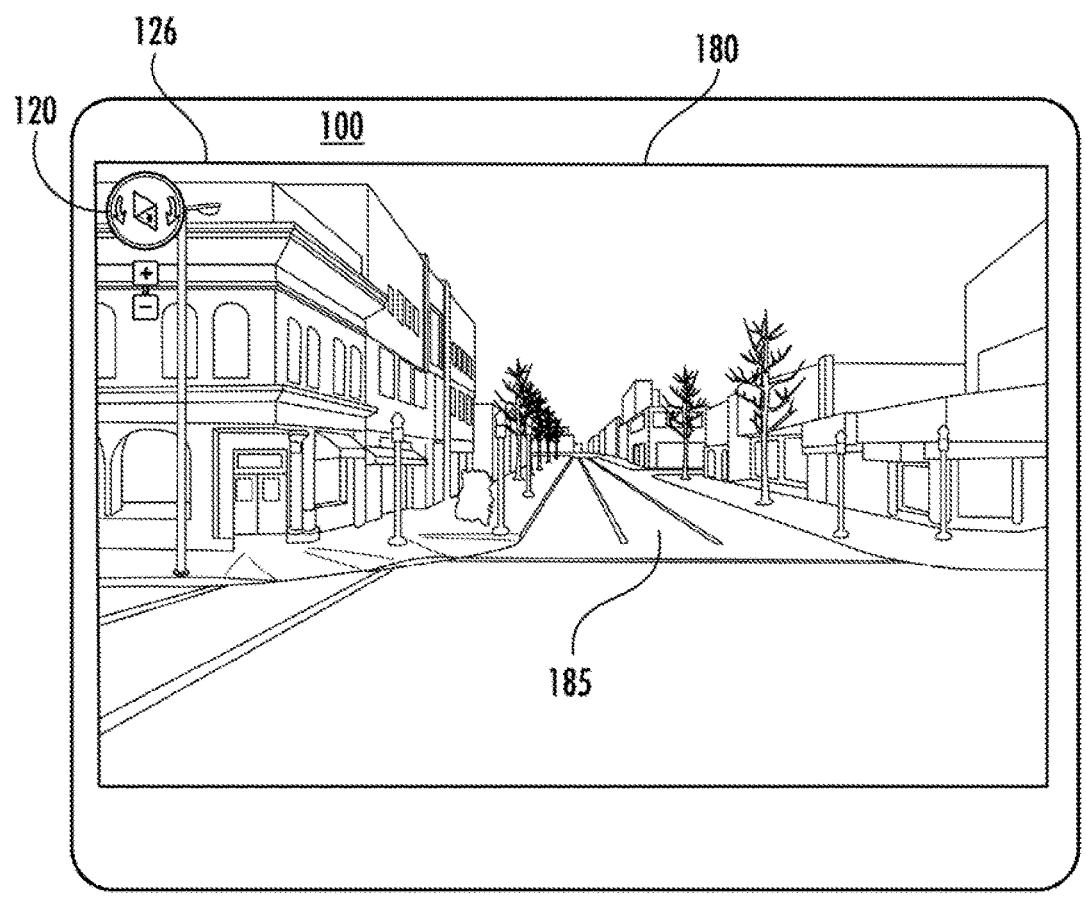

The imagery 102 can be 3D imagery or 2D imagery. The imagery 102 depicted in FIG. 1 includes a 3D oblique view of a geographic area. In other implementations, imagery 102 can include street view imagery, satellite imagery, or street map imagery. For instance, as shown in FIGS. 6, 7, and 8 the imagery can include street view imagery. While the navigation control interface of the present disclosure will be discussed with reference to imagery of a geographic area provided by a mapping tool or service, those of ordinary skill in the art, using the disclosures provided herein, should understand the control interface of the present disclosure can be used with any tool capable of navigating imagery.

When the user interface 100 is presented on display device, various tools and notices are displayed overlying the imagery 102. For instance, user interface 100 displays appropriate legal notices 106 and a scale 108 for use with imagery 102. A user input device can be used to interact with various navigation and control tools overlying the imagery 102 to navigate the imagery 102 displayed on user interface 100. For example, an input device such as a mouse, touch pad, keypad, or other suitable input device can be used to control a user manipulable cursor 110 to interact with the user interface 100. As another example, a touch screen device can be used to interact with the various tools and controls displayed overlying the imagery.

User interface 100 includes an icon 104 for changing the type of imagery displayed on user interface 100. Icon 104 can be used to change the imagery from the 3D oblique view imagery 102 depicted in FIG. 1 to street map imagery, satellite imagery, street view imagery, or other type of imagery. User interface 100 further includes a street view icon 114 that can be used to obtain a street view image of a geographic region of interest. For instance, a user can select and drag the street view icon 114 to a desired location in the imagery 102 to obtain a street view image of the desired location.

User interface 100 can further include a primary control interface 112. Primary control interface 112 can be used to zoom, pan, or tilt the imagery 102. The primary control interface 112 depicted in FIG. 1 includes a zoom control having a zoom slider that zooms the imagery in and out of the display area of user interface 100. The user can zoom the imagery in or out by selecting and dragging the zoom slider of primary control interface 112.

According to exemplary aspects of the present disclosure, a compass navigation control interface 120 ("Compass interface") is displayed overlying imagery 102. Compass interface 120 can be used to rotate the imagery among a plurality of canonical views associated with imagery 102. For instance, compass interface 120 can be used to navigate among the north view, south view, east view, and west view associated with imagery 102. A user can interact with compass interface 120, for instance, by clicking on compass interface 120 with user manipulable cursor 110 or by interacting with compass interface 120 through a touch screen.

The compass interface 120 can be initially located anywhere in the imagery 102 based on a preset location, which can be changed by the user through a user interface element, such as a preference pane, menu, or other suitable user interface element. In a particular implementation, the user can select and drag the compass interface 120 to any location on imagery 102. The compass interface 120 can be translucent to allow imagery 102 to be viewed by a user through navigation control interface 120. In some implementations, the compass interface 120 can be resized by selecting a portion of the compass interface 120 with the user manipulable cursor 110 or other suitable input and dragging the portion of the compass interface 120 across the imagery 102.

Figure 2:
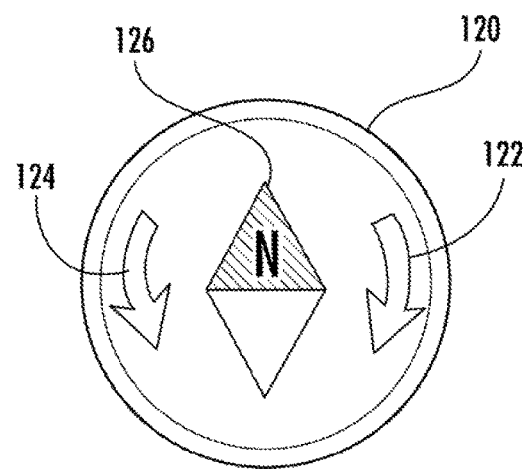
FIG. 2 depicts an exemplary navigation control interface according to are exemplary embodiment of the present disclosure.

FIG. 2 depicts a close up view of compass interface 120. As illustrated, compass interface 120 generally has a compass design. The compass interface 120 includes a plurality of static rotation control icons 122 and 124. Rotation control icon 122 includes a curved arrow pointed in the clockwise direction. Rotation control icon 124 includes a curved arrow pointed in the counterclockwise direction. A user can rotate imagery 102 among about an axis perpendicular to imagery 102 by interacting with rotation control icons 122 and 124. For instance, a user can click or select rotation control icon 122 to rotate the imagery 102 in the clockwise direction among the canonical views associated with the imagery 102, such as from a north view to a west view. A user can click or select rotation control icon 124 to rotate imagery 102 in the counterclockwise direction among the canonical views associated with the imagery 102, such as from a north view to an east view.

Compass interface 120 further includes a direction indicating portion in the form of a compass needle 126. Compass needle 126 includes an "N" designation to indicate that the compass needle is facing the north direction. Other designations are also suitable. In addition, the compass needle 126 can point in other directions, such as in the east direction, west direction, south direction, or other direction. Compass needle 126 rotates synchronously with the imagery 102 such that the compass needle 126 provides an indication of the direction the user is oriented when navigating the imagery.

A user can rotate imagery 102 by selecting one of rotation control icons 122 or 124 or by selecting and dragging the compass needle 126 to a desired rotation. As the imagery 102 rotates in response to user interaction with compass interface 120, the imagery 102 synchronously rotates with the compass needle 126. In this manner, the compass interface 120 provides a simplified user interface for rotation control of imagery among a plurality canonical views associated with imagery. In a particular implementation of the present disclosure, the user interface 100 can include a tilt, control far tilting imagery 102. The compass needle 126 can be tilted synchronously with the tilting of the imagery 102 such that the tilt angle of the compass needle 126 provides an indication of tilt angle of the imagery 102 to the user.

Figure 3:
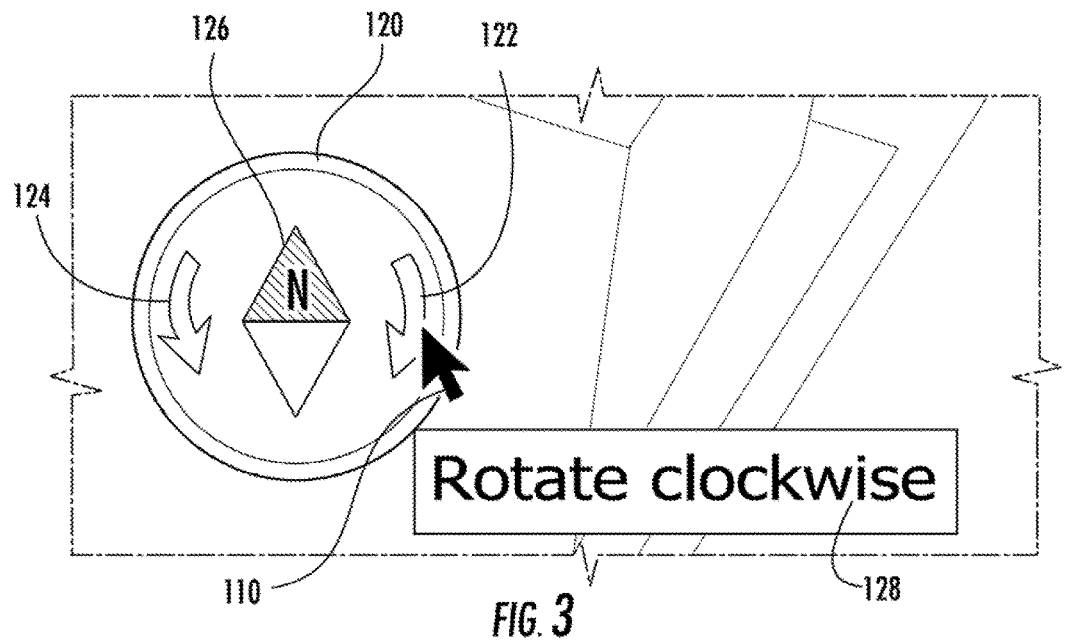
FIGS. 3 and 4 depict an exemplary navigation control interface exhibiting rotation control functionality according to an exemplary embodiment of the present disclosure.
Figure 4:
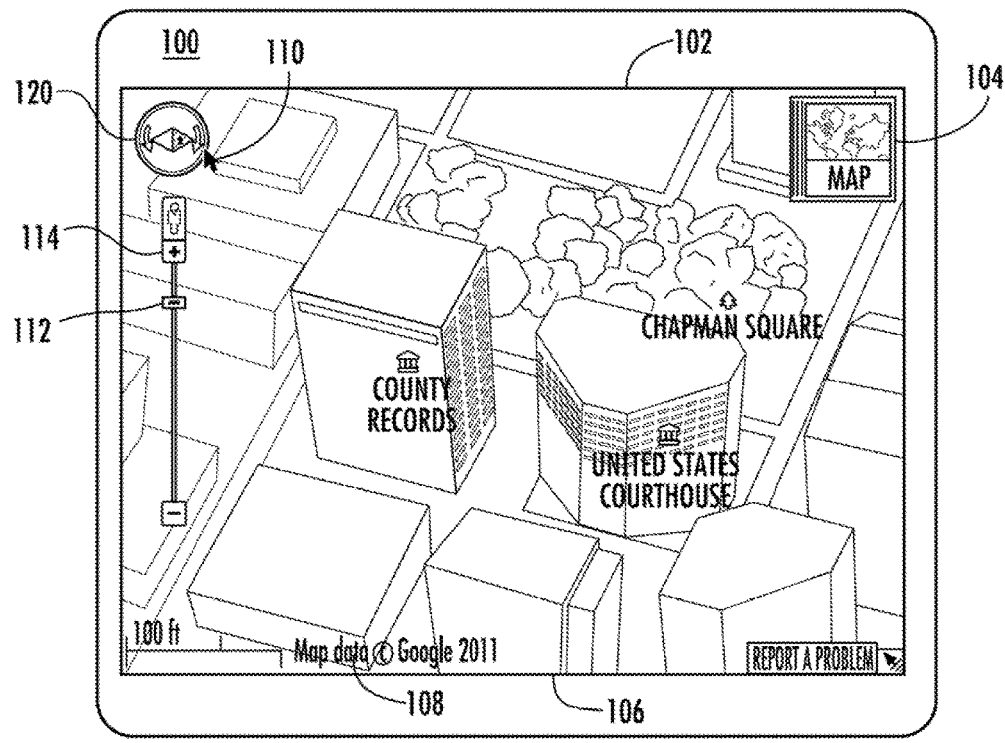

FIGS. 3 and 4 illustrate rotation control functionality using compass interface 120. FIG. 3 depicts compass interface 120 with cursor 110 located proximate to rotation control icon 122. When the cursor 110 is located proximate to or hovers aver rotation control icon 122, user interface 100 provides a display 128 describing the function associated with rotation control icon 122. In particular, the user interface 100 displays "Rotate clockwise" the cursor 110 is located proximate rotation control icon 122. User interface 100 would display "Rotate counterclockwise" if the cursor were located proximate rotation control icon 124. Other suitable notifications can also be displayed, such as "Rotate West" or other suitable notification. A user can rotate imagery 102 by interacting with rotation control icon 122. For instance, a user can single-click or tap on rotation control icon 122 to cause the imagery 102 to rotate among canonical views associated with imagery 102.

According to a particular aspects of the present disclosure, when the cursor 110 hovers proximate the compass interface 120, imagery data is preloaded or precached at a computing device associated with user interface 100. For instance, when the cursor 110 hovers proximate rotation control icon 122, the imagery data for the imagery associated with the canonical view located clockwise relative to the current view is downloaded from a server so that if the user actually clicks or interacts with the rotation control icon 122, the image is already loaded and the transition between images is smooth.

FIG. 4 depicts imagery 102 after a user has interacted with rotation control icon 122. As illustrated, the imagery 102 has been rotated in the clockwise direction from the north view to the west view of imagery 102. Compass needle 126 has also rotated in the clockwise direction to provide an indication of the orientation of the imagery 102 to the user. The imagery 102 can be returned to the north view or other predefined view using the restore functionality discussed below.

Figure 5:
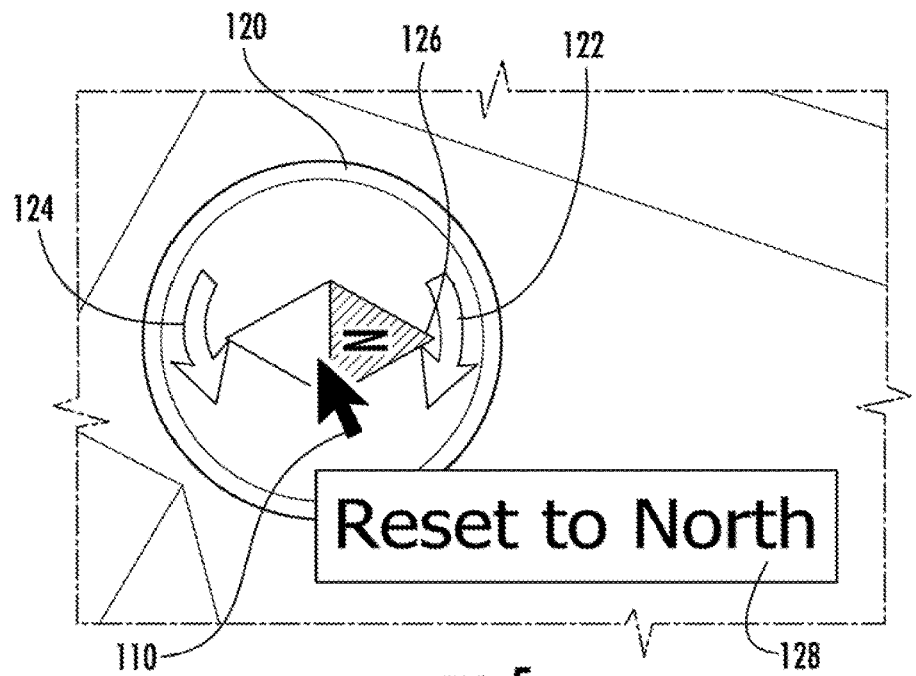
FIG. 5 depicts an exemplary navigation control interface exhibiting restore functionality according to an exemplary embodiment of the present disclosure.

FIG. 5 depicts restore functional associated with compass interface 120. In a particular implementation, a user can restore imagery 102 to a predetermined state, such as a north view, by interacting with compass needle 126. In particular, as shown in FIG. 5, when cursor 110 is proximate to or hovers near compass needle 126, the compass interface 120 provides a display 128 indicating "Reset to North." Other suitable notifications can also be displayed. Upon user interaction with compass needle 126, such as by double-clicking or double-tapping compass needle 126, the imagery 102 can be restored to the north view of the geographic area, such as the north view depicted in FIG. 1.

Although the predetermined state depicted in FIG. 5 is the north view of a geographic area, those of ordinary skill in the art, using the disclosures provided herein, should understand that other views can serve as the predetermined view for restore functionality. For instance, in the street view context, the restore functionality can return imagery to a view oriented generally along or perpendicular to a dominate road, street, vector, or other feature depicted in the street view imagery.

FIGS. 6, 7, and 8 illustrate rotation control functionality for exemplary street view imagery 180 using compass interface 120. FIG. 7 depicts a first canonical view of street view imagery 180 along a predominate road feature 185 depicted in the street view imagery 180. A user can navigate through street view imagery 180 by interacting with compass interface 120. For instance, a user can single-click or tap on a rotation control icon associated with compass interface 120 to rotate among canonical views associated with the street view imagery 180.

In particular, a user can interact with compass interface 120 to rotate the compass needle 126 associated with compass interface 120 in a clockwise or counterclockwise direction. The street view imagery 180 rotates synchronously with the compass needle 126 among a plurality of canonical views such that the street view imagery 180 displayed on user interface 100 is generally consistent with the orientation displayed by compass interface 120. In this manner, a user can navigate through street view imagery 120 by reorienting the compass needle 126 associated with the compass interface 120.

For instance, FIG. 7 depicts street view imagery 180 after it has been rotated to a second canonical view associated with the street view imagery 180. In particular, FIG. 7 depicts street view imagery 180 after it has been rotated to a view generally perpendicular to the predominate road 185 depicted in the street view imagery 180. The compass needle 126 of compass interface 120 has also been rotated to depict the compass direction associated with the second canonical view of the street view imagery 180.

A user can further rotate street view imagery 180 by further interacting with compass interface 120. For instance, FIG. 8 depicts street view imagery 180 after it has been rotated from a second canonical view generally perpendicular to the predominate road feature 185 to a third canonical view generally along the predominate road feature 185. As illustrated, the third canonical view of street view imagery 180 is along the same road feature 185 depicted in FIG. 6, just in the opposite direction. In this manner, the compass interface 120 allows a user to easily navigate street view imagery 180 between opposing views generally alone and/or perpendicular to a predominate road or other feature through simple interaction with compass interface 120.

Figure 9:
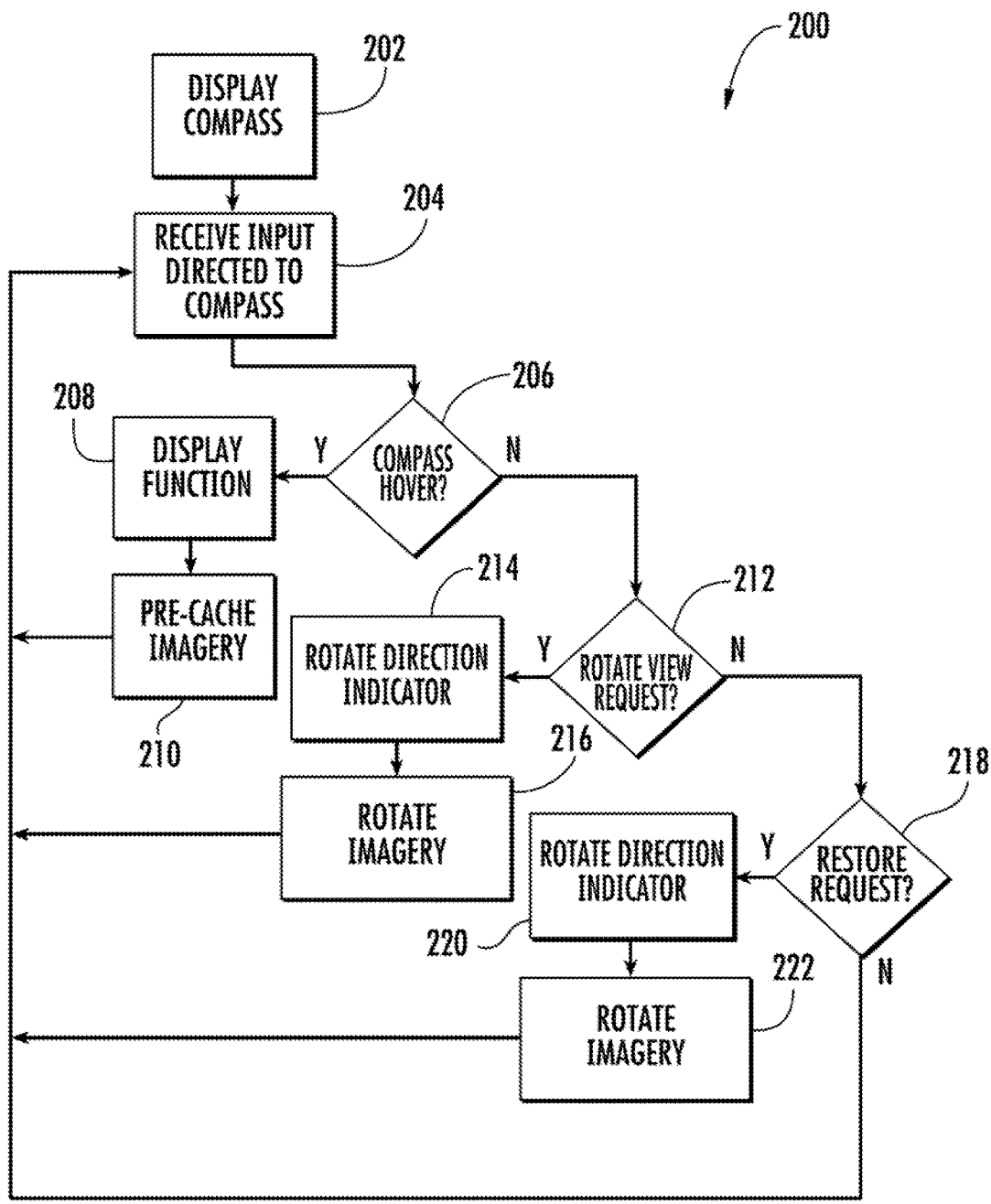
FIG. 9 depicts a flow diagram of an exemplary workflow according to an exemplary embodiment of the present disclosure.

FIG. 9 depicts a flow diagram of an exemplary workflow 200 for the compass interface 120 shown in FIGS. 1-8. The workflow 200 begins when the compass interface is displayed over the imagery at 202. At 204, the compass interface receives input from a user. The input can be generated in response to user interaction with the compass interface. For instance, an input can be generated by a user clicking on a rotation control icon with a cursor as described with reference to FIGS. 3 and 4.

If the input received is a cursor hover proximate a portion of the compass interface (206), the workflow displays the function associated with the portion of the compass proximate the cursor (208) and imagery data associated with the portion of the compass proximate the cursor is preloaded or precached (210) at a computing device associated with the interface.

Otherwise, the workflow continues to (212) where the workflow determines if the user input is a rotate view request. For instance, the workflow determines whether a user has interacted with one of the plurality of rotation control icons on compass interface. If the user input is a rotate request, the workflow rotates the compass needle on the compass interface (214) and rotates the imagery (216) synchronously with the rotation of the compass needle.

If the input is not a rotate view request, the workflow continues to (218) where the workflow determines whether the user input is a restore view request. For instance the workflow determines whether a user has interacted with the compass needle to restore imagery to a predetermined view. If the user input is a restore request, the workflow rotates the compass needle on the compass interface (220) to a predetermined direction and restores the view of the imagery to a predetermined view (222) synchronously with the rotation of the compass needle.

According to exemplary aspects of the present disclosure, the compass interface can come into view over the imagery whenever a user navigates to a particular view of the imagery where a plurality of canonical views is available. For instance, the compass interface can be animated to slide into view over the imagery when a plurality of canonical views for a geographic location is available. Other animations are also possible. The motion of the navigation control interface appearing into the imagery is intended to draw attention to the control interface to inform the user that additional canonical views are available. If the user navigates to an area where this content is no longer available, the navigation control interface can be animated to disappear from the display.

Figure 10:
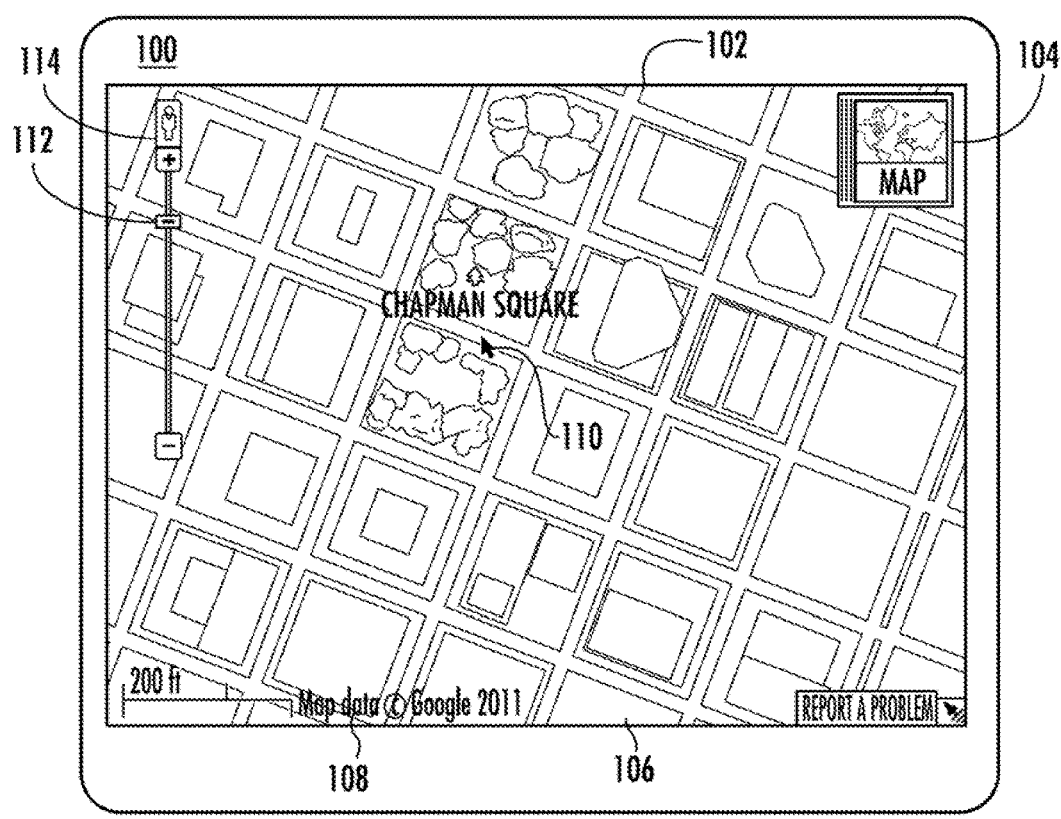
FIG. 10 depicts a user interface displaying exemplary imagery where a plurality of canonical views of the imagery are not available.

For instance, FIG. 10 depicts imagery 102 without compass interface 120. In FIG. 10, a user has zoomed the imagery 102 out of display area using zoom control 112 such that a plurality of canonical views is no longer available for imagery 102. As a result, compass interface 120 has been hidden from view so that a user knows that the user has navigated away from imagery 102 for which a plurality of canonical views are available. If the user zooms in on the imagery, for instance, to the view shown in FIG. 1, the compass interface 120 will appear over the imagery, indicating to the user that a plurality of canonical views are available.

In a particular implementation, the compass interface can be hidden while the user interacts with a primary control interface, such as a zoom, pan, or tilt control interface. For instance, the animation of the navigation control interface appearing over the imagery while a user interacts with a zoom control to avoid the issue of controls repositioning on the display while the user is interacting with the controls.

Figure 12:
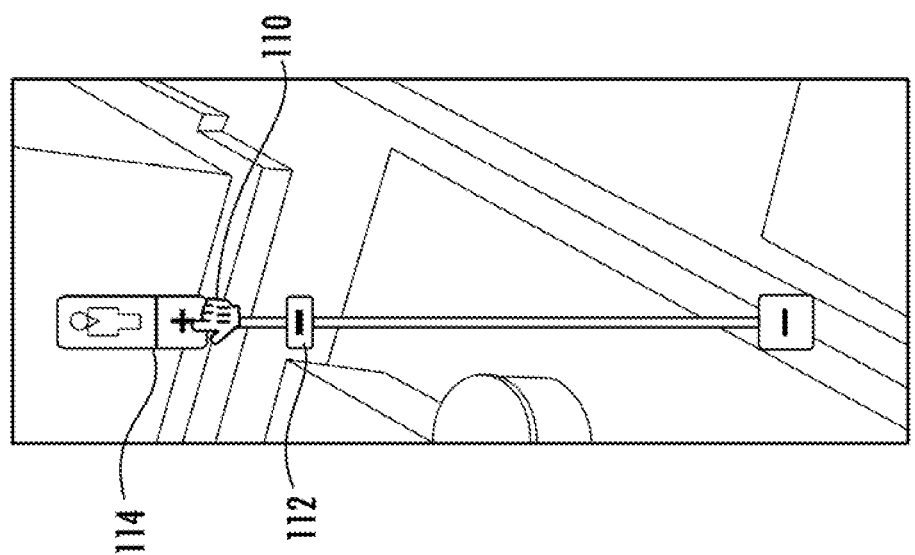
FIGS. 11 and 12 depicts exemplary functionality associated with a navigation control interface according to an exemplary embodiment of the present disclosure.
Figure 11:
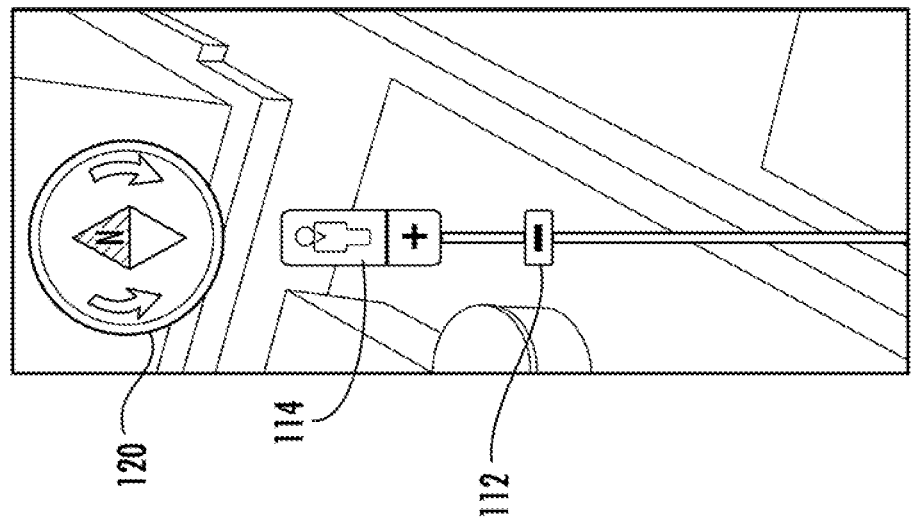

FIGS. 11 and 12 illustrate this functionality. In particular, FIG. 11 depicts imagery in which the user has positioned cursor 110 proximate zoom interface 112. As a result, compass interface 120 remains hidden from view such that user interaction with zoom control 112 is not affected by compass interface 120 appearing into view proximate the zoom control. As shown in FIG. 12, when the user moves the cursor away from zoom control 112, compass interface 120 is displayed over imagery 102.

Figure 13:
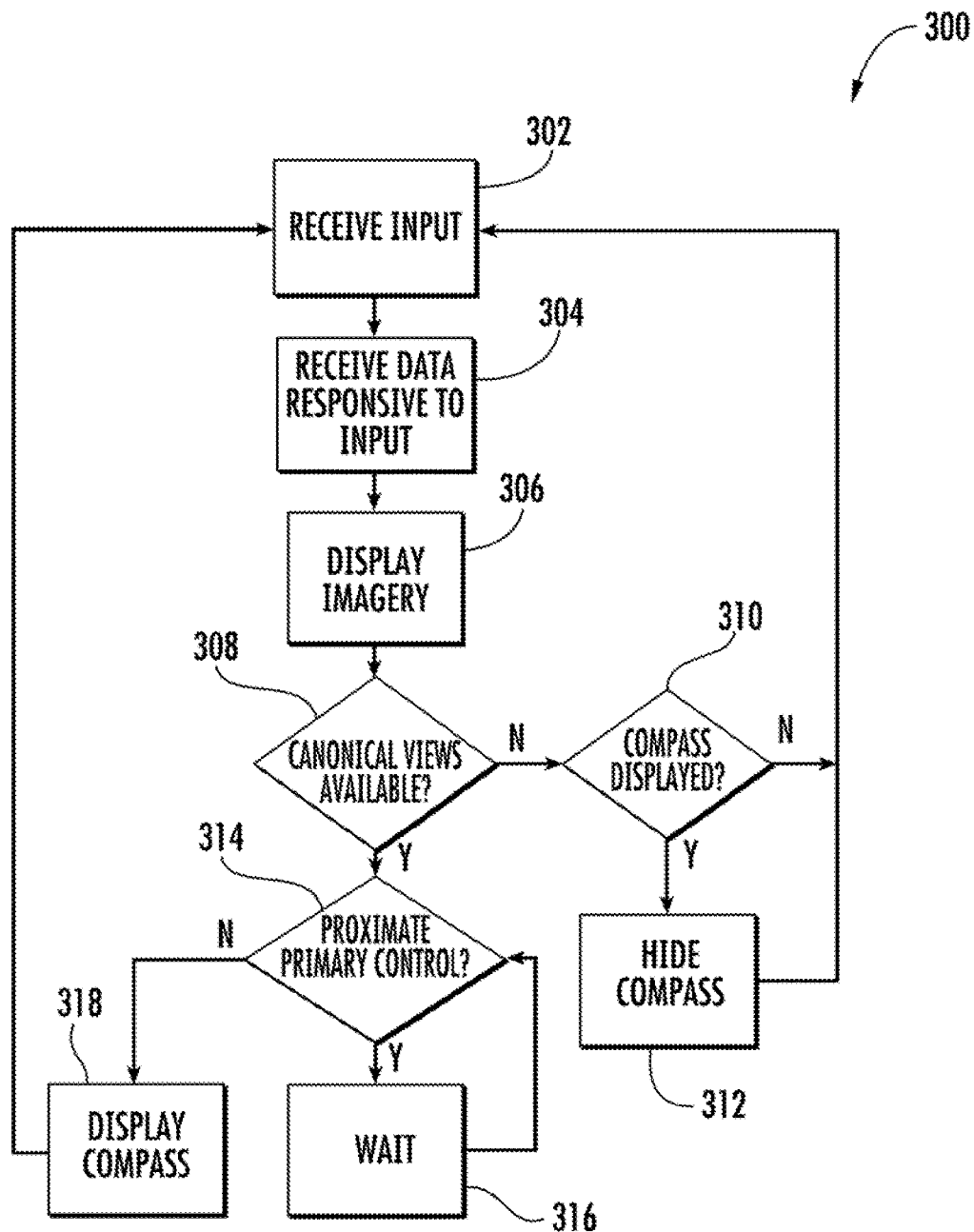
FIG. 13 depicts a flow diagram of an exemplary workflow according to an exemplary embodiment of the present disclosure.

FIG. 13 depicts a flow diagram of an exemplary workflow 300 for determining when to display and hide the compass interface over the imagery according to an exemplary embodiment of the present disclosure. The workflow begins at 302 when a user interface receives input from a user. The input can be generated in response to a user search query or in response to user interaction with the user interface. For instance, an input can be generated by a user typing in a search for a particular geographic location or by a user zooming in or out of imagery associated with the geographic are with a zoom control. In response to the user input, the workflow receives data responsive to the workflow (304) and displays imagery associated with user input (306).

At 308 the workflow determines whether canonical views are available for the imagery displayed (308). If canonical views are not available, the workflow determines if the compass interface is already displayed over imagery (310) or hidden from view. If the compass interface is displayed, the workflow hides the compass interface (312). Otherwise the workflow continues to hide the compass interface until it receives another user input.

If canonical views of the imagery are available, the workflow determines whether a user manipulable cursor is located proximate a primary control interface (314), such as a zoom control, pan control, or tilt control. If a cursor is located proximate a primary control interface, the workflow waits (316) until the cursor is no longer proximate the primary control. Once it is determined that the cursor is no longer proximate the primary control, the workflow displays the compass interface (318).

Figure 14:
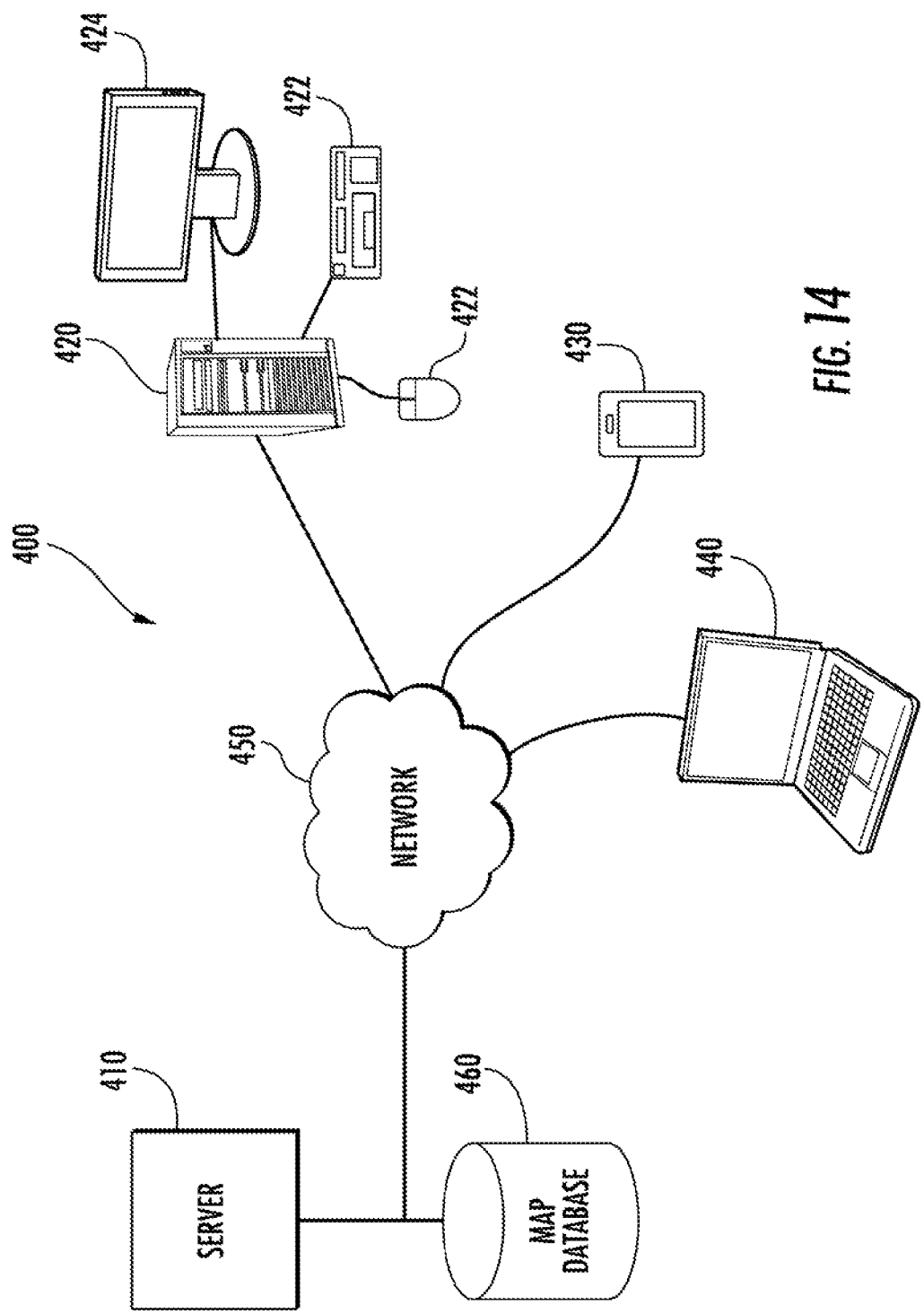
FIGS. 14 and 15 depict a schematic diagram of an exemplary system according to an exemplary embodiment of the present disclosure.

FIG. 14 depicts a schematic diagram of an exemplary computer system depicting various computing devices that can be used alone or in a networked configuration in accordance with aspects of the present disclosure. One of ordinary skill in the art, using the disclosures provided herein, will recognize that the inherent flexibility of computer-based systems allows for a great variety of possible configurations, combinations, and divisions of tasks and functionality between and among components. For instance, the computer-implemented methods discussed herein may be implemented using a single server or processor or multiple such elements working in combination. Databases and other memory/media elements and applications may be implemented on a single system or distributed across multiple systems.

For instance, FIG. 14 depicts a computer system 400 having a plurality of computing devices, such as server 410 and various client devices, such as computer 420, smartphone/PDA or tablet 430, and laptop 440. The computing devices can be interconnected via a direct connection and/or can be coupled via a communications network 450, such as a LAN, WAN, the Internet, etc., which may be wired or wireless or can include any number of wired or wireless communication links. Server 410 can be coupled to or can include various databases, such as map database 460. Server 410 can provide various data from map database 460 to the various client devices through network 450.

Each client device can include, for instance, one or more computing devices having user inputs 422 such as a keyboard, mouse, or various other types of inputs, such as a touchpad, touchscreen, stylus, joystick, buttons, etc. Computing devices can further include a display device 424, which can include, for instance, a CRT, LCD, plasma screen, touch screen, TV, projector, etc.

Figure 15:
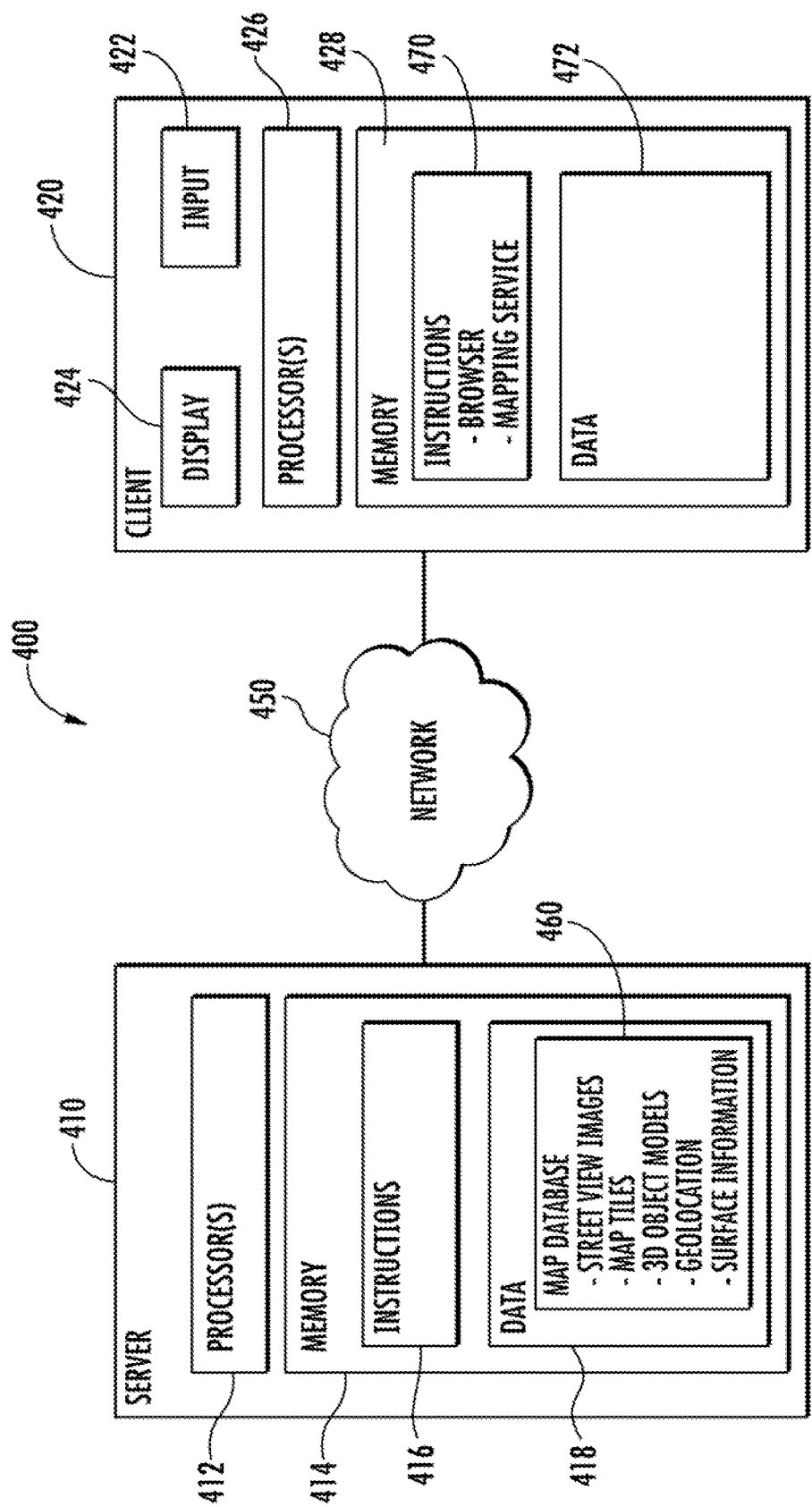

As shown in FIG. 15, the server 410 can include a processor(s) 412 and a memory 414. The processor(s) 412 can be any known processing device. Memory 414 stores information accessible by processor(s) 412, including instructions 416 that may be executed by processor(s) 412 and data 418 that may retrieved, manipulated, or stored by processor(s) 412, such as map data stored in a map database 460. Memory 414 can include any suitable computer-readable medium or media, including, but not limited to, RAM, ROM, hard drives, flash drives, or other memory devices.

The processor(s) 412 can be any processing device and can be used to execute instructions 416 to perform one or more operations to provide the compass interface functionality discussed herein. Instructions 416 can be any set of instructions that when executed by the processor(s) 412, cause the processor(s) 412 to provide desired functionality. For instance, the instructions 416 can be software instructions rendered in a computer-readable form. When software is used, any suitable programming, scripting, or other type of language or combinations of languages may be used to implement the teachings contained herein. Alternatively, the instructions can be implemented by hard-wired logic or other circuitry, including, but not limited to application-specific circuits.

Server 410 includes or is coupled to map database 460. Map database 460 of server 410 stores map-related information, at least a portion of which may be transmitted to a client device. For example, map database 460 can store map tiles where each tile is a map image of a particular geographic area. Depending on the resolution (e.g., whether the map is zoomed in or out), one tile may cover an entire region such as a state in relatively little detail. Another tile may cover just a few streets in high detail. The map information is not limited to any particular format. For example, the images may comprise street maps, satellite images, or a combination of these, and may be stored as vectors (particularly with respect to street, maps) or bitmaps (particularly with respect to satellite images). The various map tiles are each associated with geographical locations, such that the server 410 is capable of selecting, retrieving and transmitting one or more tiles in response to receipt of a geographical location.

The map database 460 can also re street level images. Street level images include images of objects at geographic locations, captured by cameras at geographic locations, in a direction generally parallel to the ground. Map database 460 can also store other information for use with a mapping service, such as 3D object models, geolocation information, surface information, navigation data, photographs associated with a geographic location, and other suitable data.

In one aspect, server 410 communicates with client device 420. Although a single client device 420 is illustrated in FIG. 15, those of ordinary skill in the art should understand that any number of client devices can be coupled to server 410 over network 420. For instance, server 410 can be a web server coupled to many client devices over the Internet. Server 410 can communicate with client device 420 using HTTP communication protocol.

Each client device can be configured similarly to the server 410, with a processor(s) 426, and memory 470. Memory can include instructions 472 and data 474. Processor(s) 426 can execute computer readable instructions 472 stored in memory 470 to cause the processor(s) 426 to perform operations, including any of the operations or workflows discussed herein. As discussed above, client device 420 can include any of a variety of display devices 424 and user input devices 422, to allow user interaction with the client device.

In a particular aspect, client device 420 can include a browser for retrieving, presenting, and navigating information provided by server 410. Client device 420 can further include a mapping service, such as Google Maps or Google Earth developed by Google Inc. (Mountain View, Calif.), or other suitable mapping service. The mapping service can allow a user of client device to navigate imagery associated with a geographic area using the navigation control interface according to the exemplary embodiments of the present disclosure discussed herein. The mapping service and navigation interface can be implemented using any suitable platform or combination of platforms, such as HTML, WebGL, Javascript, Flash, and/or other suitable platform.

While the present subject matter has been described in detail with respect to specific exemplary embodiments and methods thereof, it will be appreciated that those skilled in the art, upon attaining an understanding, of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method comprising:
presenting, by one or more computing devices, a user interface on a display device, the user interface including a display area for presenting imagery;
presenting, by the one or more computing devices, a navigation control interface depicted as a compass overlying the imagery, the navigation control interface configured to rotate the imagery about an axis perpendicular to the imagery from a first predefined canonical view to a second predefined canonical view upon user interaction with a static rotation control icon included as part of the compass, the navigation control interface comprising a direction indicating portion included as part of the compass that indicates a compass direction associated with the canonical view presented on the display device;
receiving, by the one or more computing devices, a user input directed to the static rotation control icon; and
rotating, by the one or more computing devices, the direction indicating portion from a first compass direction associated with the first predefined canonical view to a second compass direction associated with the second predefined canonical view synchronously with the imagery in response to the user input directed to the static rotation control icon,
wherein the static rotation control icon does not change as the image rotates in response to the user input.

2. The method of claim 1, wherein the direction indicating portion comprises a single rotating compass needle.

3. The method of claim 1, wherein the user interface comprises a tilt interface for tilting the imagery, the method comprising tilting, by the one or more computing devices, the direction indicating portion and the imagery synchronously upon user interaction with the tilt interface.

4. The method of claim 1, wherein the method comprises restoring, by the one or more computing devices, the imagery to a predetermined orientation in the display area upon user interaction with the direction indicating portion.

5. The method of claim 1, wherein presenting the navigation control interface comprises:
  determining, by the one or more computing devices, whether a plurality of predefined canonical views associated with the imagery are available; and
  presenting, by the one or more computing devices, the navigation control interface overlying the imagery if the plurality of predefined canonical map views associated with the imagery are available.

6. The method of claim 5, wherein presenting, by the one or more computing devices, the navigation control interface overlying the imagery comprises sliding, by the one or more computing devices, the navigation control interface into the display area over the imagery.

7. The method of claim 1, wherein the method comprises hiding, by the one or more computing devices, the navigation control interface when a plurality of canonical views associated with the imagery are not available.

8. The method of claim 1, wherein the method comprises presenting, by the one or more computing devices, a primary control interface overlying the imagery, the primary control interface configured to zoom, pan, or tilt the imagery.

9. The method of claim 8, wherein the method comprises:
  determining, by the one or more computing devices, when a user manipulable cursor is located proximate the primary control interface; and
  hiding, by the one or more computing devices, the navigation control interface when a user manipulable cursor is located proximate the primary control interface.

10. A system for navigating images; comprising:
  a display device;
  one or more processors; and
  at least one memory coupled to the one or more processors, the at least one memory comprising computer-readable instructions for execution by the one or more processors to cause said one or more processors to perform operations, the operations comprising:
  presenting a user interface on the display device, the user interface including a display area for presenting imagery;
  presenting a navigation control interface depicted as a compass overlying the imagery, the navigation control interface configured to rotate the imagery about an axis perpendicular to the imagery from a first canonical view to a second canonical view upon user interaction with a static rotation control icon included as part of the compass, the navigation control interface comprising a direction indicating portion included as part of the compass that indicates a compass direction associated with the canonical view presented on the display device;
  receiving a user input directed to the static rotation control icon; and
  rotating the direction indicating portion from a first compass direction associated with the first canonical view to a second compass direction associated with the second canonical view with the imagery in response to the user input directed to the static rotation control icon,
  wherein the static rotation control icon does not change as the image rotates in response to the user input.

11. The system of claim 10, the direction indicating portion comprises a single rotating compass needle.

12. The system of claim 10, wherein the operations comprise:
  presenting a primary control interface overlying the imagery, the primary navigation interface configured to zoom, pan, or tilt the imagery.

13. The system of claim 12, wherein the operations comprise:
  determining when a user manipulable cursor is located proximate the primary control interface; and
  hiding the navigation control interface when a user manipulable cursor is located proximate the primary control interface.

14. The system of claim 10, wherein the user interface comprises a tilt interface for tilting the imagery, the operations comprising:
  tilting the direction indicating portion and the imagery synchronously upon user interaction with the tilt interface.

15. One or more non-transitory computer-readable media having computer-readable instructions that when executed by one or more processors, causes the one or more processors to perform operations, the operations comprising:
  presenting a user interface on a display device, the user interface including a display area for presenting imagery;
  presenting a navigation control interface depicted as a compass overlying the imagery, the navigation control interface configured to rotate the imagery about an axis perpendicular to the imagery from a first view of the imagery to a second view of the imagery upon user interaction with a static rotation control icon included as part of the compass, the navigation control interface comprising a direction indicating portion included as part of the compass that indicates a compass direction associated with the view presented on the display device;
  receiving a user input directed to the navigation control interface; and
  rotating the direction indicating portion from a first compass direction associated with the first view to a second compass direction associated with the second view with the imagery in response to the user input directed to the navigation control interface;
  wherein the static rotation control icon does not change as the image rotates in response to the user input.

16. The one or more non-transitory computer-readable media of claim 15, wherein the operations comprise:
  determining whether a plurality of views associated with the imagery are available; and
  presenting the navigation control interface overlying the imagery if the plurality of views associated with the imagery are available.

17. The one or more non-transitory computer-readable media of claim 15, wherein the operations comprise hiding the navigation control interface when a plurality of views associated with the imagery are not available.

18. The one or more non-transitory computer-readable media of claim 15, wherein the operations comprise:
  presenting a primary control interface overlying the imagery, the primary navigation interface for zooming, panning, or tilting the imagery;
  determining when a user manipulable cursor is located proximate the primary control interface; and
  hiding the navigation control interface when a user manipulable cursor is located proximate the primary control interface.

19. The one or more non-transitory computer-readable media of claim 15, wherein the operations comprise:
  determining when a user manipulable cursor is located proximate the at least one rotation control icon;

receiving imagery data associated the second view when the user manipulable cursor is located proximate the rotation control icon; and displaying the second view upon user interaction with the rotation control icon.

20. The one or more non-transitory computer-readable media of claim 15, wherein the user interface comprises a tilt interface for tilting the imagery, the operations comprising:

tilting the direction indicating portion and the imagery synchronously upon user interaction with the tilt interface.

* * * * *